(«12») United States Patent
Shaaban et al.

(10) Patent No.: US 11,138,566 B2
(45) Date of Patent: Oct. 5, 2021

(54) METHOD AND APPARATUS FOR TRACKING, CAPTURING, AND SYNCHRONIZING ACTIVITY DATA ACROSS MULTIPLE DEVICES

(71) Applicant: Fulcrum Global Technologies Inc., Chicago, IL (US)

(72) Inventors: Ahmed Farouk Shaaban, South Barrington, IL (US); Venkat Thandra, South Barrington, IL (US)

(73) Assignee: Fulcrum Global Technologies Inc., Chicago, IL (US)

( * ) Notice: Subject to any disclaimer, the term of this patent is extended or adjusted under 35 U.S.C. 154(b) by 605 days.

(21) Appl. No.: 15/253,639

(22) Filed: Aug. 31, 2016

(65) Prior Publication Data

US 2018/0060824 A1 Mar. 1, 2018

(51) Int. Cl.
*G06Q 10/10* (2012.01)
*G06Q 40/00* (2012.01)
*G06Q 20/14* (2012.01)
*G06F 16/27* (2019.01)
*G06F 16/25* (2019.01)

(52) U.S. Cl.
CPC ......... *G06Q 10/1091* (2013.01); *G06F 16/25* (2019.01); *G06F 16/275* (2019.01)

(58) Field of Classification Search
CPC .... G06Q 10/1091; G06F 16/25; G06F 16/275
See application file for complete search history.

(56) References Cited

U.S. PATENT DOCUMENTS

| 6,292,801 B1 * | 9/2001 | Campbell | H04L 41/00 370/338 |
| 9,396,232 B1 * | 7/2016 | Kapoor | G06Q 10/1091 |
| 10,234,290 B2 * | 3/2019 | Lush | G01S 5/02 |
| 10,692,048 B2 * | 6/2020 | Haines | G06Q 10/109 |

(Continued)

FOREIGN PATENT DOCUMENTS

WO 2013184744 A2 12/2013

OTHER PUBLICATIONS

International Search Report for International Application No. PCT/US2017/049529 dated Nov. 29, 2017, 4 pages.

(Continued)

*Primary Examiner* — Talia F Crawley
(74) *Attorney, Agent, or Firm* — Global IP Counselors, LLP

(57) ABSTRACT

Methods and apparatuses, including computer programs encoded on computer storage media, for capturing tracked activity data and synchronizing the tracked activity data across multiple devices. One of the methods includes, a controller, in communication with a plurality of user devices, receiving identification of activities to be tracked from a first user device of a group of user devices associated with a single user identification. Thereafter, the controller receives the tracked activity data from any user device of the group of user devices, and sends the tracked activity data to the other user devices of the group of user devices. The method includes generating a user interface based on the identified activities, the tracked activity data, and the additional tracked activity data from other user devices. The method includes generating a time entry by populating a time entry template based on the selected activity data.

40 Claims, 11 Drawing Sheets

(56) References Cited

U.S. PATENT DOCUMENTS

| | | |
|---|---|---|
| 2005/0210104 A1 | 9/2005 | Torvinen |
| 2007/0130217 A1 | 6/2007 | Linyard et al. |
| 2009/0234761 A1* | 9/2009 | Taylor .................... G06Q 40/02 |
| | | 705/32 |
| 2013/0345978 A1* | 12/2013 | Lush ..................... G06F 3/0484 |
| | | 701/533 |
| 2014/0058801 A1* | 2/2014 | Deodhar ............ G06Q 10/0639 |
| | | 705/7.38 |
| 2015/0156567 A1* | 6/2015 | Oliver .................... G08B 21/24 |
| | | 340/870.07 |
| 2015/0220883 A1* | 8/2015 | B'Far .................. G06Q 10/105 |
| | | 700/91 |
| 2016/0217428 A1* | 7/2016 | Shaaban ................ G06Q 30/04 |
| 2017/0046649 A1* | 2/2017 | Kyle, Jr. ........ G06Q 10/063114 |
| 2017/0116552 A1* | 4/2017 | Deodhar .......... G06Q 10/06316 |
| 2017/0245237 A1* | 8/2017 | Thompson ............ H04W 4/029 |
| 2017/0301039 A1* | 10/2017 | Dyer ....................... H04M 1/00 |
| 2017/0323225 A1* | 11/2017 | Caligor .................. G06Q 10/00 |
| 2019/0279179 A1* | 9/2019 | Shaaban .............. G06Q 20/102 |

OTHER PUBLICATIONS

Written Opinion of the ISA for International Application No. PCT/US2017/049529 dated Nov. 29, 2017, 9 pages.
Office Action dated Apr. 20, 2021 in corresponding European Patent Application No. 17777425.4.

* cited by examiner

METHOD AND APPARATUS FOR TRACKING, CAPTURING, AND SYNCHRONIZING ACTIVITY DATA ACROSS MULTIPLE DEVICES

FIELD

The present disclosure relates generally to activity tracking systems and, in particular, to methods and apparatus for tracking activity data, capturing activity data, and synchronizing the tracked and captured activity data on multiple user devices, and generating a time entry.

BACKGROUND

Computerized time entry systems that facilitate the time entry process have been in existence for many years. In industries that bill according to an hourly rate, time entry systems have become essential to numerous aspects of business operations including billing, payroll, and financial planning. Accordingly, existing time entry systems provide useful mechanisms for tracking time spent on tasks in support of these numerous business processes.

However, existing time entry systems suffer from a number of drawbacks. Existing time entry systems require a great deal of user input in order to create an entry. For example, time entry systems may require user input to generate a timesheet and manually enter the time spent on a task. The time entry system may also require user-input to gather data about each matter (e.g., client name, file name, task description, etc.) every time an entry is made. Manually inputting time data can lead to several errors and thus inaccurate time entries. The laborious and time-intensive nature of this data entry process frequently leads to delayed time entry, which results in user input occurring at a later date and relying on the user's ability to reconstruct multiple weeks of tasks completed. Accordingly, a need exists for a method and apparatus designed to generate a time entry without relying so heavily on user input.

Another drawback of existing time entry systems is that they are not designed to synchronize a user's time entry across multiple computing devices in real-time. Existing time entry systems are generally designed for a traditional working environment that is based on a single desk and a single phone line. Furthermore, current synchronization techniques often require a large amount of processing time, resulting in synchronization delays and do not provide for real-time synchronization across multiple user devices. These drawbacks make time entry imprecise and inefficient.

SUMMARY

The instant disclosure describes methods and apparatuses for capturing tracked activity data and synchronizing the tracked activity data across multiple devices. In one embodiment, a controller, in communication with a plurality of user devices, receives identification data for a group of user devices, wherein the group of user devices are associated with a single user identification. The controller also receives identification of activities to be tracked from a first user device of the group of user devices. Thereafter, the controller receives the tracked activity data from any user device of the group of user devices, and sends the tracked activity data to the user devices of the group of user devices other than the user device that originally provided the tracked activity data.

In another embodiment, within a user device of the group of user devices, activities to be tracked are identified. The user device then tracks data concerning at least one of the identified activities to provide the tracked activity data and sends the tracked activity data to the controller. Thereafter, the user device receives additional tracked activity data from other user devices of the group of user devices. The user device may generate a user interface based on the identified activities, the tracked activity data, and the additional tracked activity data from other user devices.

In another embodiment, a method for generating a time entry is disclosed. In this embodiment, the controller receives a request for unallocated activity data corresponding to a user device and sending the unallocated activity data to the user device responsive to the request. Subsequently, the controller receives a selection indication corresponding to a selected portion of the unallocated activity data from the user device. The controller then generates the time entry based on the selected portion of the unallocated activity data.

In another embodiment a user device sends, to the controller, a request for unallocated activity data corresponding to the user device and subsequently receives the unallocated activity data from the controller. The user device then generates a user interface based on the unallocated activity data, and sending a selection indication corresponding to a selected portion of the unallocated activity data.

Related apparatuses and computer readable media are also disclosed.

BRIEF DESCRIPTION OF THE FIGURES

The features described in this disclosure are set forth with particularity in the appended claims. These features will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION

Figure 1:
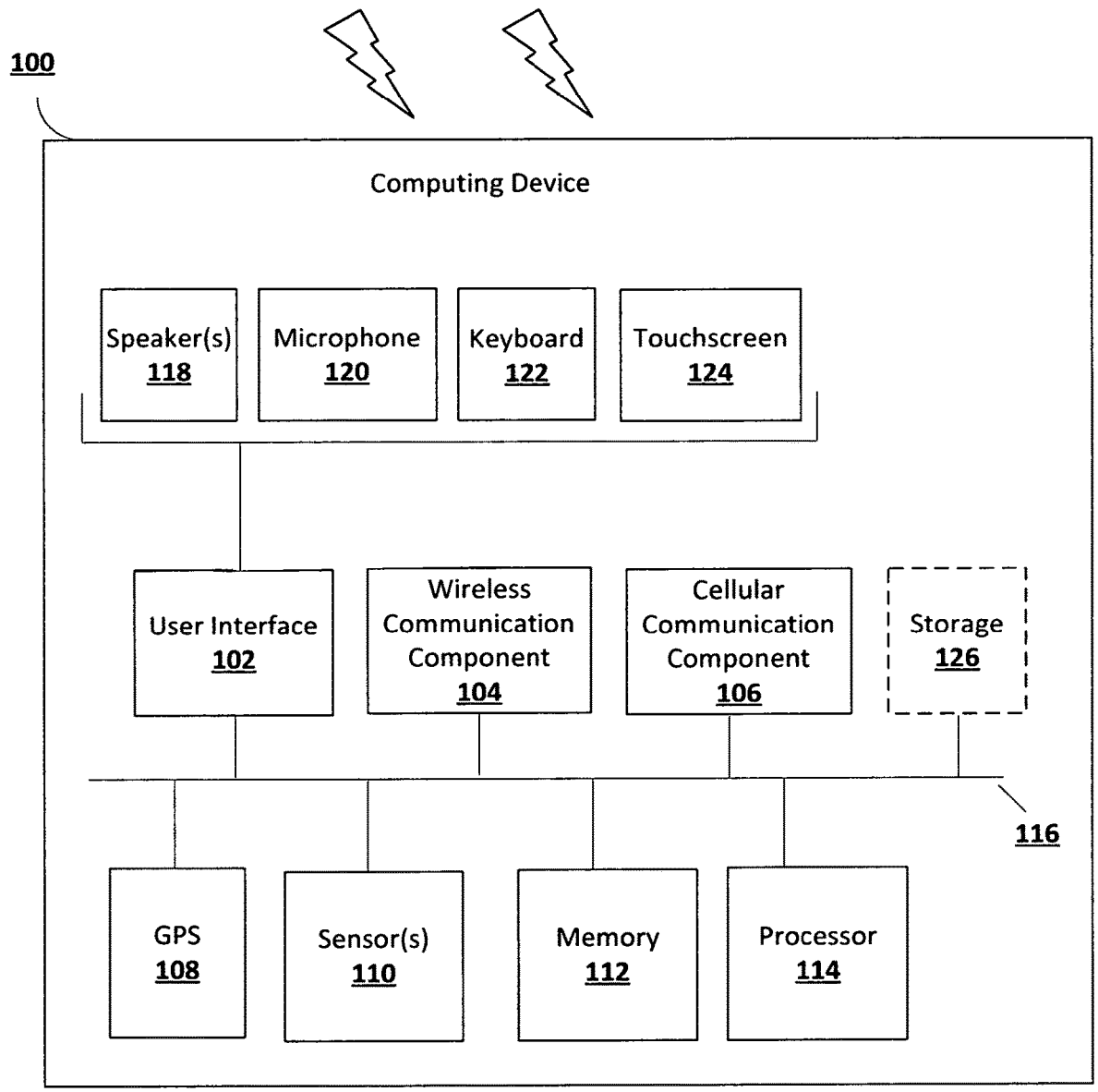
FIG. 1 is a block diagram generally depicting one example of an apparatus in accordance with the present disclosure.

FIG. 1 illustrates an apparatus 100 for capturing, processing, and synchronizing activity data in accordance with the present disclosure. The user device(s) 100 may be a desktop computer, laptop computer, tablet computer, cellular device (such as a mobile phone), or similar computing device that may be configured to perform the functions described herein. Generally, user device(s) 100 may be any type of computing device or transmitter that is configured to transmit data or receive data in accordance with methods and functions described herein. As used herein, user device(s) 100 may be a single user device or a plurality of user devices that are part of a group of user devices that are associated with a single user identification.

The user device(s) 100 may include a user interface 102, speaker(s) 118, microphone 120, keyboard 122, touchscreen 124, a wireless communication component 104, a cellular communication component 106, a global positioning system (GPS) receiver 108, sensor(s) 110, memory 112, processor 114 and storage 126. Components illustrated in FIG. 1 may be linked together by a shared digital pathway 116. The user device(s) 100 may also include hardware to enable communication within the user device(s) 100 and between the user device 100 and other user devices within the group of user devices and controller(s) (not shown). For example, the hardware may include transmitters and a receiver.

The user interface 102 may be configured to function according to a wired or wireless communication protocol. In some examples, the user interface 102 may include speaker(s) 118, microphone(s) 120, keyboard 122, touchscreen 124, and/or any other elements for receiving inputs, as well as one or more display devices, and/or any other elements for communicating outputs. The user interface 102, may comprise any conventional display mechanism such as a cathode ray tube (CRT), flat panel display, or any other display mechanism known to those having ordinary skill in the art. In an embodiment, user interface 102, in conjunction with executable instructions 206 implemented via controller(s) 204 (not shown), may be used to implement a graphical user interface. Implementation of a graphical user interface in this manner is well known to those having ordinary skill in the art.

Storage subsystem 126 may provide a repository for tracked and captured activity data used in accordance with the instant disclosure. In another embodiment, storage subsystem 126 may provide an additional computer-readable medium for storing the basic programming and data constructs that provide the functionality of user device(s) 100. Software (programs, code modules, instructions) that when executed by processor 114 provide the functionality of the instant disclosure and may be stored in storage subsystem 126.

The wireless communication component 104 may be a communication interface that is configured to facilitate wireless data communication for the user device(s) 100 according to one or more wireless communication standards. For example, the wireless communication component 104 may include a Wi-Fi communication component that is configured to facilitate wireless data communication. As another example, the wireless communication component 104 may include a Bluetooth communication component that is configured to facilitate wireless data communication. Other examples are also possible.

The cellular radio communication component 106 may be a communication interface that is configured to facilitate wireless communication (voice and/or data) with a cellular wireless base station to provide mobile connectivity to a network. For example, the cellular radio communication component 106 may be configured to connect to a base station of a cell in which the user device 100 is located.

The GPS receiver 108 may be configured to determine a location of the user device(s) 100 by precisely timing signals sent by GPS satellites.

The sensor(s) 110 may include one or more sensors. Example sensors include any sensor located within the user device(s) 100, which include: single-axis or multi-axis accelerometer, single-axis or multi-axis gyroscope, a magnetometer, an electromagnetic field sensor, a laser rangefinder sensor, pedometer, camera(s), Wi-Fi, near field communication (NFC), Bluetooth, projector, or other location and/or context-aware sensors.

In another embodiment, the wireless location component 104, GPS 108, or sensor(s) 110 of user device 100 may determine the identity of one or more wireless access points and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores data regarding where each unique wireless access point is located. Based on the distance from each wireless access point, and the known location of each of the wireless access points, location data associated with the user device(s) 100 may be generated.

The memory 112 may also store program instructions that can be accessed and executed by the processor 114. The processor 114 may be a single central processing unit (CPU), multiple CPUs, or a single CPU having multiple processing cores in various embodiments. The memory 112 may be representative of a random access memory, e.g., Static Random Access Memory (SRAM), Dynamic Random Access Memory (DRAM), read-only memory, or flash memory. The memory 112 may also process data collected by the user interface 102, sensor(s) 110, wireless communication component 104, the cellular radio communication component 106, the GPS receiver 108, or any other hardware component capable of receiving input data.

In another embodiment, the processor 114 may be configured to process one or more geographical location datasets of the user device(s) 100 using one or more location-determination components, such as sensor(s) 110, wireless communication component 104, cellular radio communication component 106, or GPS receiver 108. The processor 114 may use a location-determination algorithm to determine a location of the user device(s) 100 based on a presence and/or location of one or more known wireless access points within a wireless range of the user device 100. The processor 114 may perform any number of functions based on the captured location data. As will be discussed in additional detail below with regard to FIG. 9, the data captured by user device(s) 100 by means of the above-mentioned location-determination components can facilitate the generation of a time entry by specifying the location and/or activity corresponding to user device(s) 100.

User device(s) 100 are configured to communicate with software modules in order to track, capture, and process activity data when executed by processor 114. In one embodiment, user device 100 is configured to track and capture activity data from word processing programs (e.g.

Microsoft Word™) that have an electronic document open in it. A description of this process will be discussed in additional detail below with regard to FIG. 10.

In other embodiments, user device(s) 100 may capture activity data from a plurality of software modules, including electronic presentation programs (e.g. Microsoft PowerPoint™), electronic spreadsheet programs (e.g. Microsoft Excel™), Voice over Internet Protocol (VoIP), data entry systems, e-mail and messaging systems, and other software modules that contain activity data that is tracked in order to perform the functionality described herein.

The shared digital pathway 116 is illustrated as a wired connection; however, wireless connections may also be used. For example, the shared digital pathway 116 may be a wired serial bus such as a universal serial bus or a parallel bus, or a wireless connection using, e.g., short-range wireless radio technology.

While the user device 100 has been described as one form for implementing the methods described herein, those having ordinary skill in the art will appreciate that other, functionally equivalent methods may be employed. Other implementations of the user device 100 may include a greater or lesser number of components than those illustrated. Once again, those of ordinary skill in the art will appreciate the wide number of variations that may be used in this manner. Further still, although a single processing device 114 is illustrated in FIG. 1, it is understood that a combination of such processing devices may be configured to operate in conjunction (for example, using known networking techniques) to implement the teachings of the instant disclosure.

Figure 2:
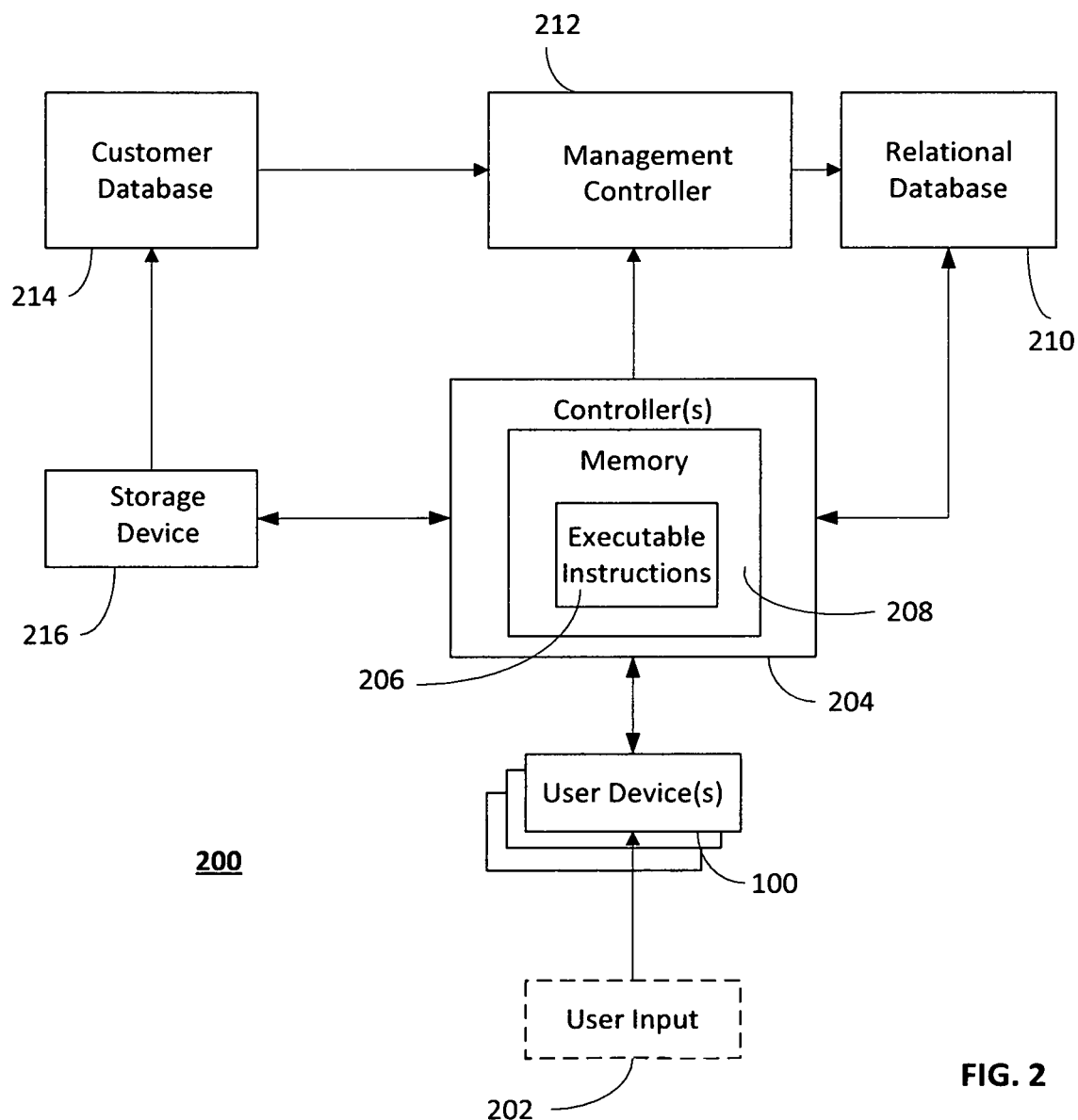
FIG. 2 is a block diagram generally depicting one example of a system in accordance with the present disclosure.

FIG. 2 illustrates a representative processing system 200 that may be used to implement the teachings of the instant disclosure. The illustrated controller(s) 204 operate to synchronize data between user device(s) 100, relational database 210, management controller 212, customer database 214, and storage device 216, thereby making tracked activity generated on one user device available and up-to-date on the other user devices as well. Although controller(s) 204 are illustrated as being directly connected to user device(s) 100, relational database 210, management controller 212, customer database 214, and storage device 216, those having ordinary skill in the art will appreciate that tracked activity data may be communicated over one or more private or public communication networks, databus(ses), or other communication channels using suitable techniques known in the art.

Controller(s) 204 are configured to process the tracked activity data when controller(s) 204 receives and executes programming instructions 206 stored in memory 208. Memory 208 may comprise one or more devices such as volatile or nonvolatile memory including but not limited to random access memory (RAM) or read only memory (ROM). Further still, memory 208 may be embodied in a variety of forms, such as a hard drive, optical disc drive, etc. In an embodiment, the controller(s) 204 may comprise one or more server computers implementing suitable operating software, as known in the art.

As previously stated, there may be one or more user devices 100 operatively connected to controller(s) 204 via known communication channels. The user device(s) 100 are configured to communicate with controller(s) 204. Thus, user device(s) 100 may be configured to receive data from controller(s) 204, and may also be configured to send data to controller(s) 204 as described in greater detail below.

The controller(s) 204 receive input data from the user device(s) 100 through user input 202, e.g., though user interaction with a microphone 120 (e.g. dictation), keyboard 122, touchscreen 124, or any other suitable input mechanism known in the art. In other embodiments, controller(s) 204 receive tracked activity data from the user device(s) 100 through data capture by means of internal communication with software modules, wireless communication component 104, cellular communication component 106, GPS 108, sensor(s) 110 or any other suitable capture mechanism known in the art.

Upon receiving the tracked activity data from user device(s) 100, controller(s) 204 send the tracked activity data to storage device 216, wherein the tracked activity data is temporarily stored. Examples of the storage device 216 include a database server, a network file system (NFS), local disk space, or a data storage provider offering its services over the Internet such as cloud website hosting space, etc.

In one embodiment, customer database 214 continuously checks for newly tracked activity data within storage device 216. When new tracked activity data is detected, customer database 214 pulls the tracked activity data from storage device 216. When added to the storage device 216 by the controller(s) 204, any newly received (by the controller(s)) tracked activity data is cleansed by the controller(s) 204 according to well-known techniques in order to ensure that the tracked activity data does not contain ex-ors and is appropriately formatted. In accordance with well-known techniques, the customer database 214 can retrieve (pull) the tracked activity data from the storage devices 216 and, after customer database 214 has pulled the tracked activity data, it is removed from storage device 216.

Customer database 214 stores all tracked activity data and data records. Data records contain data which may be maintained and used when allocating the tracked activity data. The data records may be configured to contain data related to specific matters, clients, tasks, users, or any other information entered to create a record. For example, a data record may include the location identification of a client (e.g., client's office) which may be used to track activity data corresponding to that client. As demonstrated in FIG. 9, the location identification may be captured by the user device 100, wherein the controller(s) 204 recognizes the location as being associated with the corresponding client. In this manner, the location previously entered as a data record is matched to the tracked activity data captured at that location by the user device(s) 100. All of this data is then presented as a visual indicator 902 when the user interface is generated. A detailed discussion of how this data is used to generate a time entry is discussed in further detail below. This example is intended to be illustrative only and it should be understood that the particular data stored in the data record may vary from implementation to implementation, depending on the specifies of particular situations.

Figure 11:
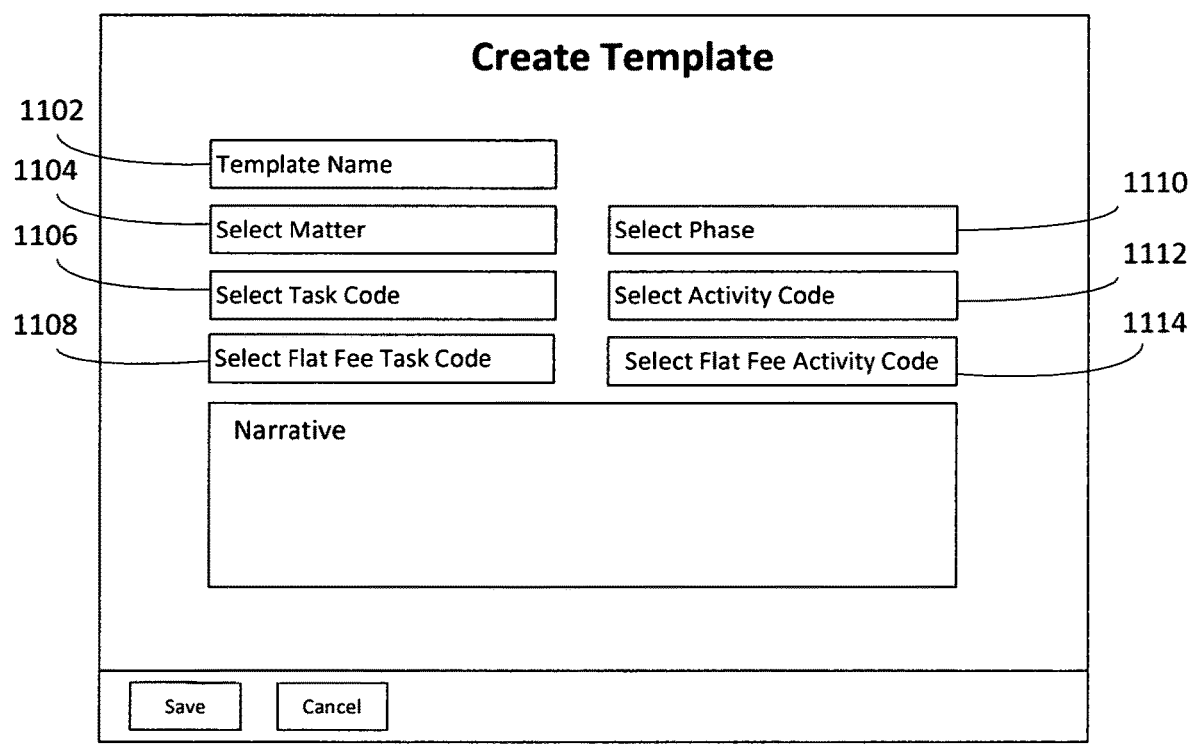
FIG. 11 illustrates an example of a time entry template in accordance with the present disclosure.

The data record might also include other data, such as the client's name, billing information (e.g, hourly rate), matter associated with the client, etc. This additional information is created by entering the data into time entry template 1100, as shown in FIG. 11. Time entry template 1100 is a template that serves as a basis for creating a time entry. Time entry template 1100 has a format that can be useful in efficiently matching tracked activity data with one or more corresponding datasets located within the time entry template 1100.

The process of completing a time entry template begins with the user device(s) 100 prompting the controller(s) 204 to provide a time entry template 1100. The time entry template 1100 comprises a plurality of fields that include: template name 1102, matter name 1104, task code 1106, fee code 1108, phase name 1110, activity code 1112, flat fee activity code 1114 and any other field required to create a time entry. The template name 1102 may be an identifier assigned by an organization for tracking purposes. For example, the name may be the name of a client or the name of a matter. Matter name 1104 may be the matter of record in which the activity is associated with. For example, a legal case, a project a development plan, or any other matter in which time is being tracked for. Task code 1106 may be a numeric identifier for the task undertaken to complete the matter of record. For example, file a complaint, attend a court hearing, file a discovery motion, attend a deposition, etc. Fee code 1108 may be a numerical value assigned to the activity undertaken in order to complete the task. For example, a task completed during litigation may be assigned a different fee than a task completed during settlement. Phase name 1110 identifies the phase in which the task is completed. For example, if a matter contains multiple phases and a task is being completed during the early stages of the matter the phase name may be "Phase 1." Activity code 1114 is a numeric code that is assigned to an activity that is undertaken in order to complete the task. Examples of activity codes may include: preparing, emailing, scheduling, calling, meeting, drafting editing, etc. A flat fee activity code 1114 a numeric code that is assigned to a matter that is not billed hourly. For example, a budget is given by a client to complete a matter and the organization must stay within the budget. The flat fee activity code 1114 is a numeric or alphanumeric identifier assigned to all the tasks that are undertaken in order to complete that matter and the fees are deducted from the set budget. The flat fee activity code 1114 may be utilized as a budgeting tool that helps mitigate excess costs.

When all of the data is input into the time entry template 1100, it is saved and stored in customer database 214 as a data record by the controller(s) 204 and customer database 214 via the storage device 216. As will be discussed in further detail below, the data stored in the time entry template 1100 will correspond to the tracked activity data that is tracked and captured by user device(s) 100.

Once the tracked activity data is stored in customer database 214 it is sent to management controller 212, wherein the data is converted for further processing. The management controller 212 may be one or more appropriately programmed computers implementing one or more applications for managing the tracked activity data. For example, SAP Netweaver™ software, by SAP SA, may be used for this purpose. The management controller 212 communicates with the customer database 214, relational database 210, and external processing systems (not shown).

In another embodiment, management controller 212 provides a mechanism wherein the tracked activity data is converted into a uniform format so that it may be exported from processing system 200 to external processing systems (not shown). Via the management controller 212, the tracked activity data is exported to outside processing systems so that the tracked activity data may be generated into a wide variety of business data, such as data relating to business transactions, invoices, human resources data, user account data, receipts, bank account data, accounting data, payroll data, and generally, any data relevant to the operation of a particular business.

In another embodiment, the relational database 210 may receive the tracked activity data from management controller 212 or directly from controller(s) 204. Relational database 210 allows processing system 200 to operate on a database using the standards of the SQL-based relational model. In one embodiment, relational database 210 provides a database wherein the tracked activity data is organized and stored according to any one of the corresponding fields: timer operation, glossaries, time entries, and templates. A timer operation is a method for recording the duration of a tracked activity data. A glossary is an alphabetical list of terms or words found in or relating to a specific matter, task, client, etc. The glossary also provides a short-cut when a narrative is created. For example, a task name is entered (e.g. deposition) and a narrative describing the activities associated with a deposition is populated into the narrative. A time entry is the recorded duration of the tracked activity data. A template is a form with fields, wherein data that will be used repetitively may be stored in order to minimize the data entry process.

Through pattern recognition, relational database 210 may drive intelligence from tracked activity data that has been previously captured, user input habits, past time entries, or any other pattern recognized in the captured activity data and provide the controller(s) 204 with the data pulled from recognized patterns in order to create a time entry. For example, the user device 100 may track activity data for a client in which the same activity was captured before (e.g. employment contracts are drafted for an organization multiple times). In this example, relational database 210 provides the task, matter, client name, and fee associated with the tracked activity data to populate the time entry template when a time entry is generated for this activity data. Relational database 210 may also provide narrative assistance by populating the narrative based on narrative pattern recognition.

Figure 3:
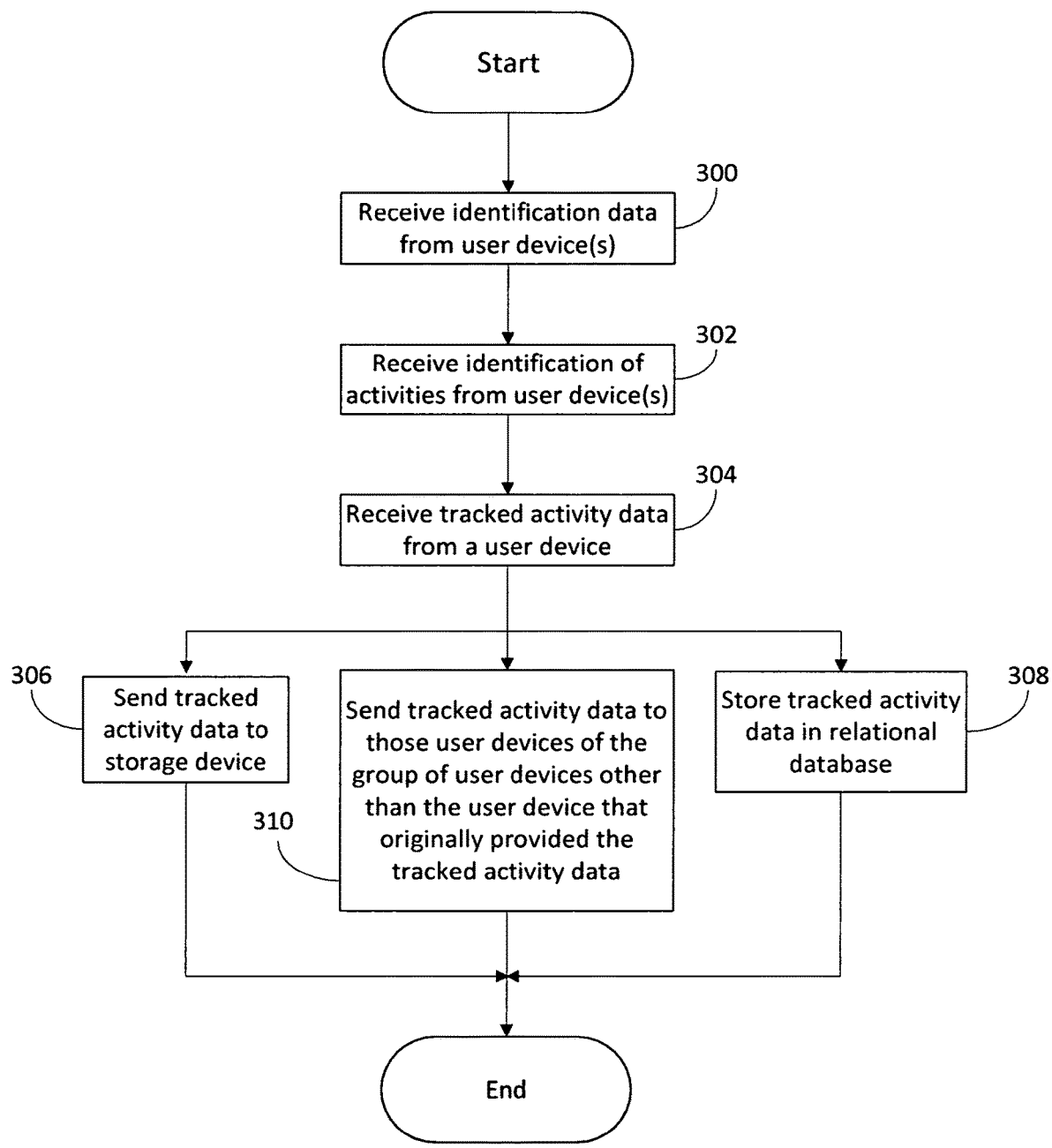
FIG. 3 is a flowchart generally depicting an embodiment of a method for synchronizing tracked activity data in accordance with the present disclosure.

Referring now to FIG. 3, a flowchart illustrating one example of a method for synchronizing tracked activity data in a processing system comprising controller(s) 204 in communication with user device(s) 100. In particular, the processing illustrated in FIG. 3 concerns operation of the controller(s) 204. While the processing system 200 is a form for implementing the methods described herein, those having ordinary skill in the art will appreciate that other, functionally equivalent techniques may be employed. For example, as known in the art, some or all of the functionalities implemented via executable instructions 206 may also be implemented using firmware and/or hardware devices such as application specific integrated circuits (ASICs), programmable logic arrays, state machines, etc. Further still, other implementations of the user device(s) 100 may include a greater or lesser number of components than those illustrated. Once again, those of ordinary skill in the art will appreciate the wide number of variations that may be used is this manner.

Beginning at block 300, identification data for a group of user device(s) 100 of the plurality of user devices is received by the controller(s) 204, wherein the group of user devices are associated with a single user identification. In an embodiment, such identification data for the group of user devices may come from one or more of the relevant user devices. As used herein, identification data is an identifying marker that associates each user device 100 with the corresponding single user identification, thereby forming a group of user devices. In turn, the single user identification may comprise any suitable information used to uniquely identify an individual time keeper, such as a user login identification and password. For example, a single user may utilize a plurality of user devices (e.g. a mobile phone, computer tablet, laptop computer, smart watch, and desktop computer). When the controller(s) 204 synchronizes the tracked activity data across the user's multiple devices it does so according to the single user identification that defines the relevant group of user devices. In another embodiment, the identification data of the user devices can come from another source, including an external software module, external controller, security service provider, or other trusted authority.

Regardless of the manner in which the group identification data is received, processing continues at block 302, where the controller(s) 204 receives identification of activities to be tracked from user device(s) 100. Tracked activity data is activity data that is tracked by user device 100. Examples of tracked activity data include drafting a document, attending a hearing conducting a meeting, participating in a phone call, or any other activity associated with completing a task. At block 304, the controller(s) 204 receives tracked activity data from a user device 100. At block 306, the controller(s) 204 sends tracked activity data to storage device 216, wherein the tracked activity data is pulled by customer database 214 for additional storage and processing. At block 308, the controller(s) 204 sends tracked activity data to relational database 210, wherein the tracked activity data is stored according to any one of the corresponding fields: time entries, timer operation, glossaries, and templates, as previously discussed above. At block 310, the controller(s) 204 sends tracked activity data to those user devices 100 of the group of user devices other than the user device 100 that originally provided the tracked activity data. Although not shown, the controller(s) 204 continually synchronizes additional tracked activity data to the user devices of the group of user devices other than the user device that provided the additional tracked activity data.

Figure 4:
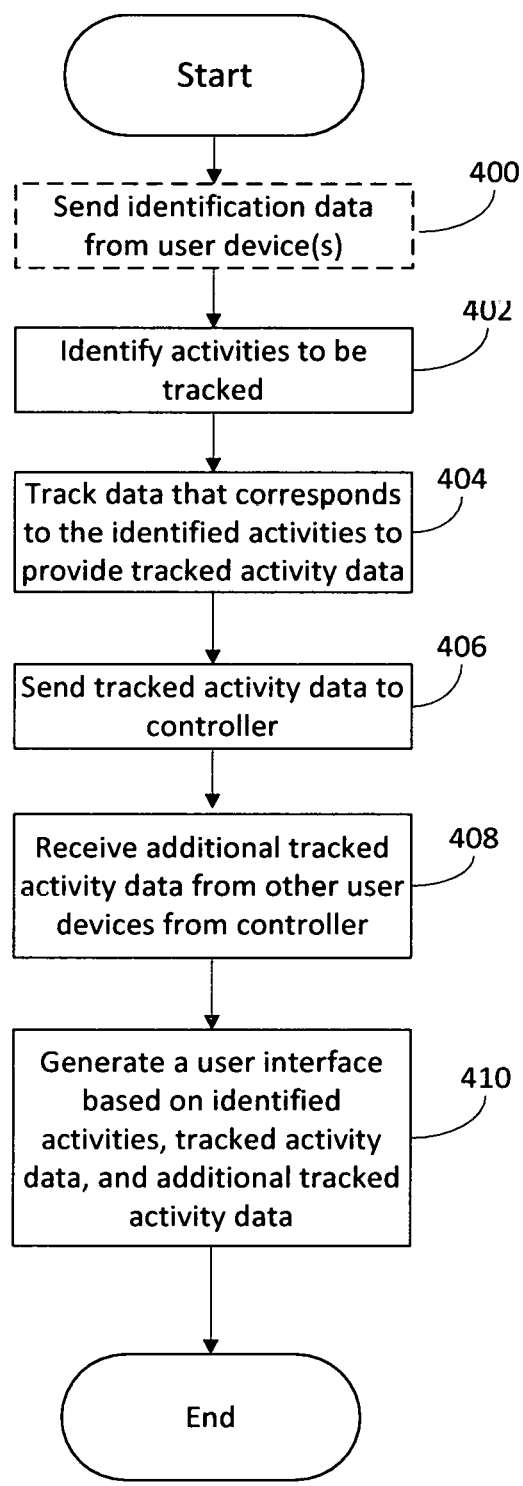
FIG. 4 is a flowchart generally depicting another embodiment of a method for identifying tracked activity data in accordance with the present disclosure.
Figure 7:
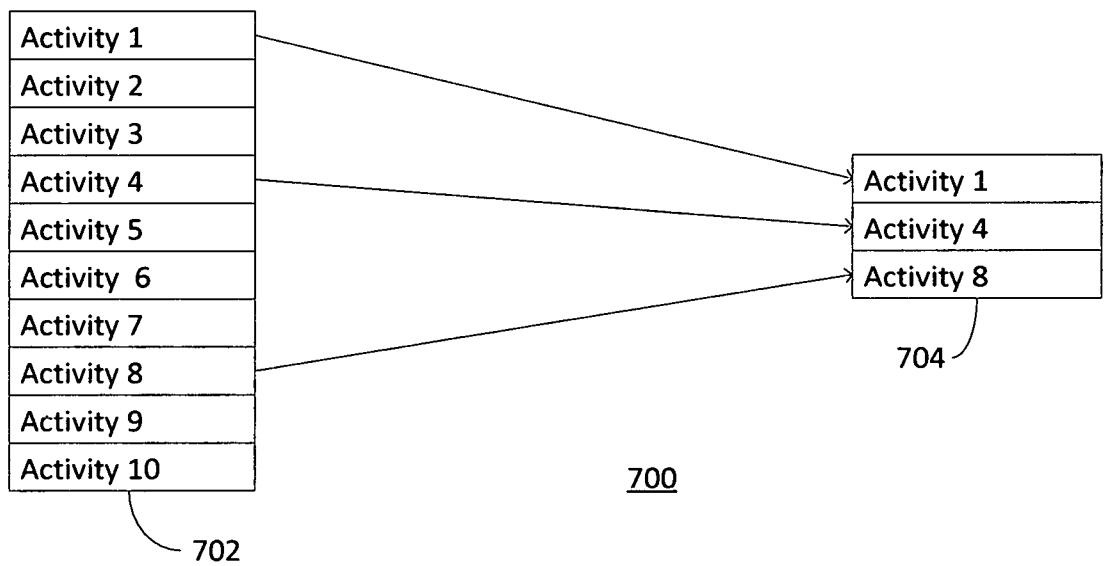
FIG. 7 is an illustration that demonstrates identifying tracked activity data in accordance with the present disclosure.

FIG. 4 is a flowchart illustrating one example of a method for identifying and tracking activity data in a processing system comprising controller(s) 204 in communication with user device(s) 100. In particular, the processing illustrated in FIG. 4 concerns operation of the user device(s) 100. The process begins at block 400, with user device(s) 100 optionally sending identification data for a group of user devices (as described above) to the controller(s) 204, wherein the group of user devices are associated with a single user identification. At block 402, activities to be tracked are identified by user device(s) 100 and information identifying such activities is sent by the user device to the controller(s) 204. Activities to be tracked are identified activities that are selected so that only those activities are tracked and synchronized across the group of user devices. In this manner, the system disclosed herein is able to more efficiently process and synchronize the tracked activity data. FIG. 7 depicts one example of how the activities to be tracked are identified, as described in greater detail below.

At block 404, user device(s) 100 tracks data that corresponds to the identified activities in order to provide tracked activity data, as described in further detail below. At block 406, user device(s) 100 sends tracked activity data to controller(s) 204. At block 40$, user device 100 receives additional tracked activity data from other user devices via controller(s) 204. At block 410, a user interface 102 is generated based on identified activities, tracked activity data, and additional tracked activity data. Additional tracked activity data is tracked activity data that is tracked by the user devices 100 of the group of user devices other than the user device that originally provided the tracked activity data.

Figure 5:
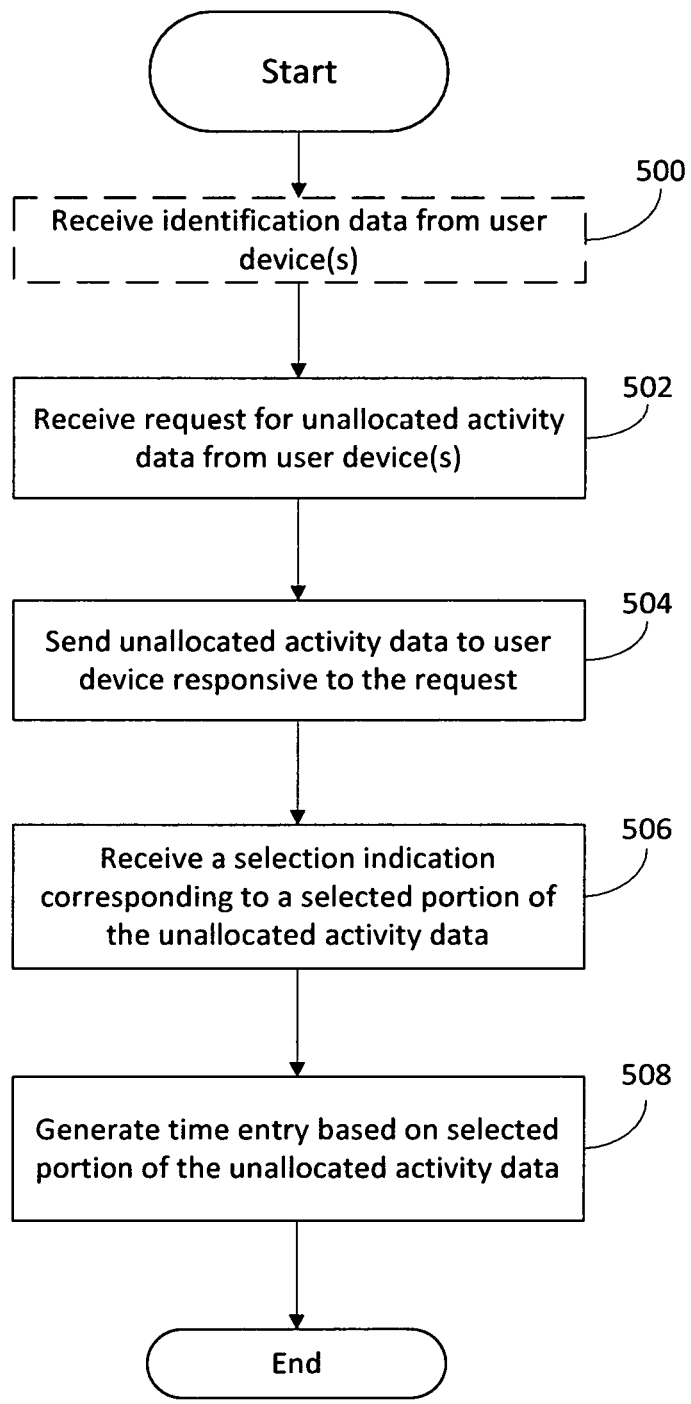
FIG. 5 is a flowchart generally depicting an embodiment of a method for processing captured activity data in accordance with the present disclosure.

FIG. 5 is a flowchart illustrating one example of a method for processing captured tracked activity data in a processing system comprising controller(s) 204 in communication with user device(s) 100. In particular, the processing illustrated in FIG. 5 concerns operation of the controller(s) 204. Beginning at block 500, identification data for a group of user device(s) 100 of the plurality of user devices is optionally received by the controller(s) 204, wherein the group of user devices are associated with a single user identification. At block 502, controller(s) 204 receives a request for unallocated activity data from user device(s) 100. Unallocated activity data is data that has been captured by any user device of the group of user devices associated with a single user identification and that has not yet been used as the basis for generating a time entry. At block 504, controller(s) 204 sends unallocated activity data to user device 100 responsive to the request. At block 506, controller(s) 204 receives a selection indication corresponding to a selected portion of the unallocated activity data. A method for selecting a portion of the unallocated activity data is described in further detail below with reference to FIG. 5. In an embodiment, after controller(s) 204 receives the selection indication, the controller(s) 204 will calculate the duration of the selected portion(s) of the unallocated activity data by adding the duration of each selected portion. Thereafter, at block 508, the controller(s) 204 creates a time entry by importing data corresponding to the selected portion of the unallocated activity data from the relational database 210 into the time entry template.

Figure 6:
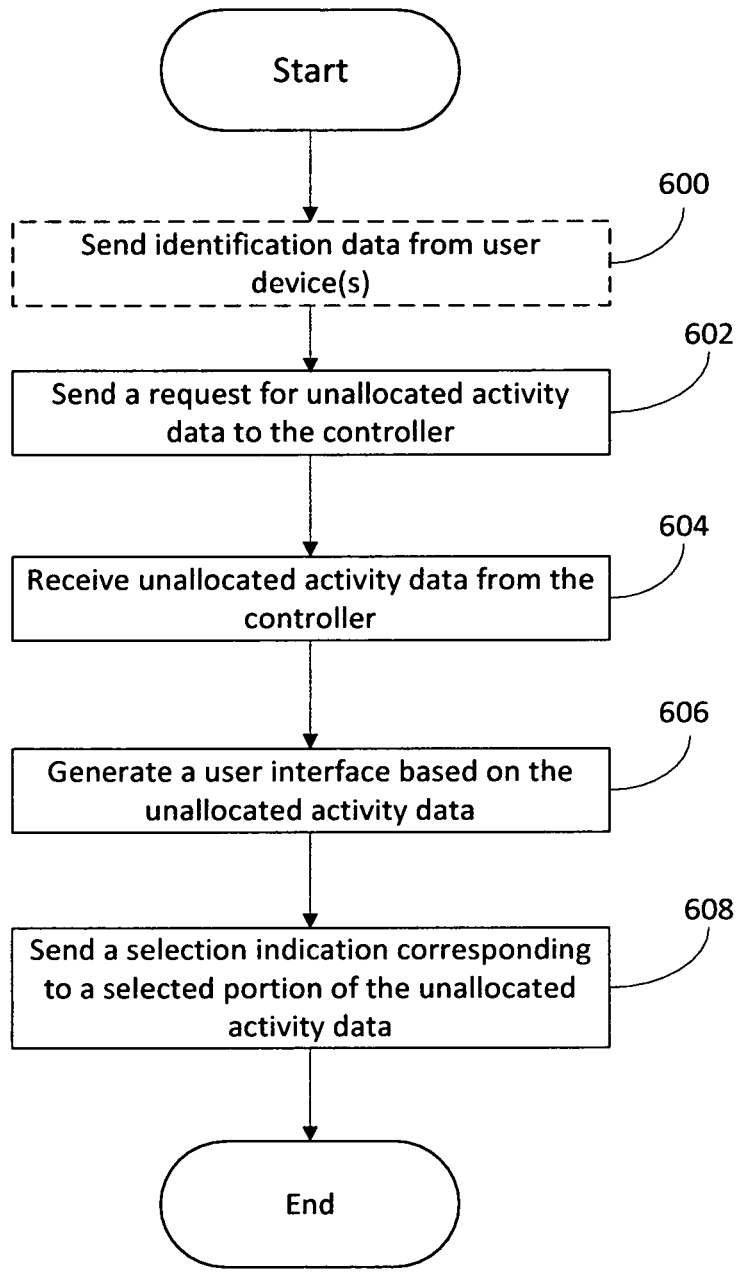
FIG. 6 is a flowchart generally depicting another embodiment of a method for capturing activity data in accordance with the present disclosure.

FIG. 6 is a flowchart illustrating one example of a method for capturing tracked activity data in a processing system 200 comprising controller(s) 204 in communication with user device(s) 100. In particular, the processing illustrated in FIG. 6 concerns operation of the user device(s) 100. Beginning at block 600, identification data for a group of user device(s) 100 of the plurality of user devices is optionally sent by user device(s) 100 to the controller(s) 204, wherein the group of user devices are associated with a single user identification. At block 602, user device 100 sends a request for unallocated activity data to the controller(s) 204. At block 604, user device 100 receives unallocated activity data that has been processed from controller(s) 204. At block 606, a user interface is generated based on the unallocated activity data received from controller(s) 204. The generation of the user interface further includes the generation of a visual indicator that represents the duration of the unallocated activity data, as described in additional detail below. At block 608, user device(s) 100 sends a selection indication, which corresponds to a selected portion of the unallocated activity data, to controller(s) 204. As described below relative to a specific embodiment for generating a selection indication, the selection indication may correspond to a visual indicator that is displayed on a user interface and has been relocated in order to generate a time entry. A visual indicator is a graphical element that is representative of the unallocated activity data that has been tracked and captured by user device(s) 100. In an embodiment, a characteristic of the visual indicator is representative of a duration of discrete elements of unallocated activity data. Furthermore, in an embodiment, each visual indicator provides data regarding the unallocated activity data. For example, the visual indicator may include a time that the unallocated activity was captured, a location where the unallocated activity was captured, the data stored in the time entry template that is associated with the unallocated activity, and any other data captured or tracked by the user device(s) 100 that may be used to create a time entry.

FIG. 7 depicts one example of how activity data is identified to be tracked for data synchronization. The process begins with user device 100 identifying activities to be tracked. In response to a request from user device 100, a list of activities 702 is displayed (e.g. Activity 1-10). The activity list comes from the relational database 210. In this example, Activity 1, Activity 4, and Activity 8 are the identified activities to be tracked 704. For example, Activities 1, 4 and 8 could be identified by selection of an appropriate check box or the like when the list of activities 702 is displayed on an appropriate display. Thereby, controller(s) 204 only receives tracked data corresponding to Activity 1, Activity 4, and Activity 8. In this manner, there is a smaller exchange of data involved, thereby making the synchronization process significantly faster. Furthermore, controller(s) 204 will only receive tracked activity data for Activity 1, Activity 4, and Activity 8 from other user devices in the group of user devices associated with a single user identification. During synchronization, controller(s) 204 will only send user device 100 the activity data corresponding to Activity 1, Activity 4, and Activity 8 that was tracked from other user devices. Furthermore, only modifications related to Activity 1, Activity 4, and Activity 8 or the data records associated with the identified activity data are synchronized.

Figure 8:
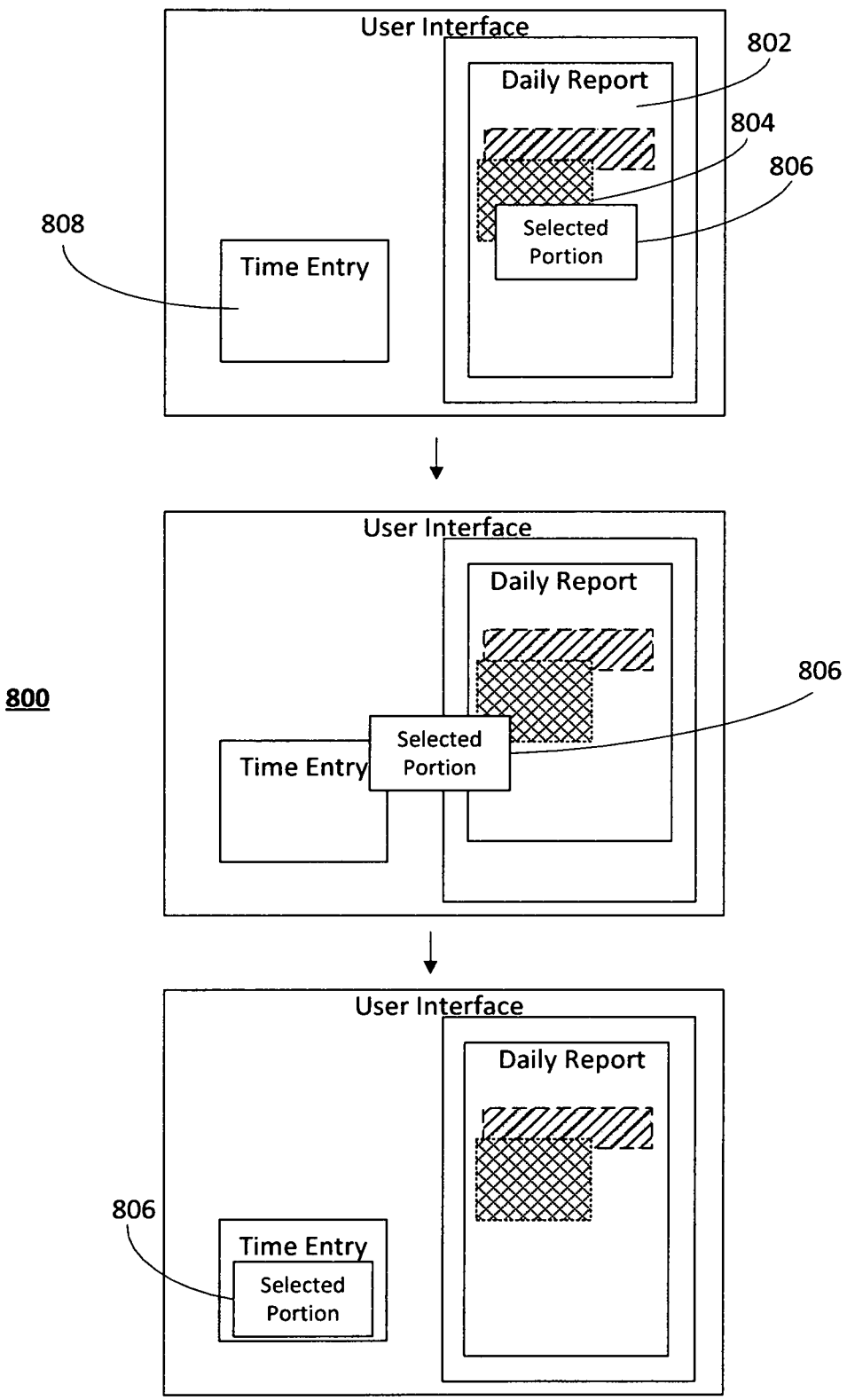
FIG. 8 illustrates an example of a user interface that may be used to create a time entry in accordance with the present disclosure.

FIG. 8 illustrates a generation of user interface 800. In the example illustrated in FIG. 8, user interface 800 is illustrated as a sequence from top to bottom in order to demonstrate the progression of the process described. As previously described, relative to FIG. 5, the process begins with the user device 100 sending a request for unallocated activity data to the controller(s) 204 (not shown). The controller(s) 204 receives the request for unallocated activity data and processes the unallocated activity data as described in FIG. 2. Controller(s) 204 sends the processed unallocated activity data to user device 100, which then generates user interface 800.

User interface 800 is shown in "Time Entry" mode. In Time Entry mode, user interface 800 includes a designated section labeled as "Daily Report" 802, which includes an hourly time table (not shown) and visual indicators 804 that are representative of the unallocated activity data captured for that day. As shown in FIG. 8, separate elements of unallocated time data are represented by separate visual indicators each illustrated with different cross-hatching Each visual indicator is shaped and sized such that in the case that there is a simultaneous display of the visual indicators, each visual indicator remains selectable despite overlapping regions of the visual indicators. Therefore, each visual indicator is configured so that it remains unobstructed by other visual indicators and has a visual characteristic that is different than the other visual indicators. In this example, the user interface 800 further includes an outlined area that is labeled as "Time Entry" 808. A visual indicator is selected 806 from the "Daily Report" section 802 and relocated (e.g., dragged and dropped) into the "Time Entry" section 808. Once again, technique for implementing such relocation functioning are well-known in the art. Responsive to the selected portion of unallocated activity data 806 being chosen in this manner, controller(s) 204 receives the selection indication indicating the selected portion of unallocated activity data. Thereafter, controller(s) 204 generates a time entry based on the selected visual indicator 806.

In another embodiment, the controller(s) 204 generates a time entry based on a plurality of visual indicators that have been selected. The controller(s) 204 generates a time entry by calculating the duration of the selected portions of the visual indicators and populating a time entry template with the data record associated with the selected portions of the unallocated activity data. As previously discussed relative to FIG. 1, the data record contains data that includes the client's name, matter, task, a fee, a phase, and an activity.

Figure 9:
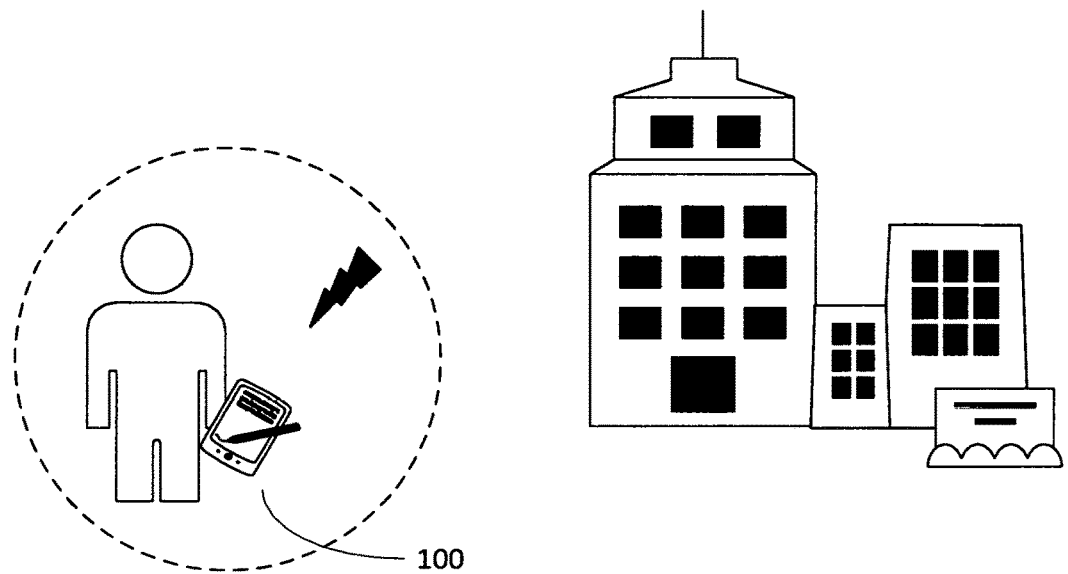
FIG. 9 illustrates an example of a user interface on a user device for capturing activity data in accordance with the present disclosure.
Figure 9:
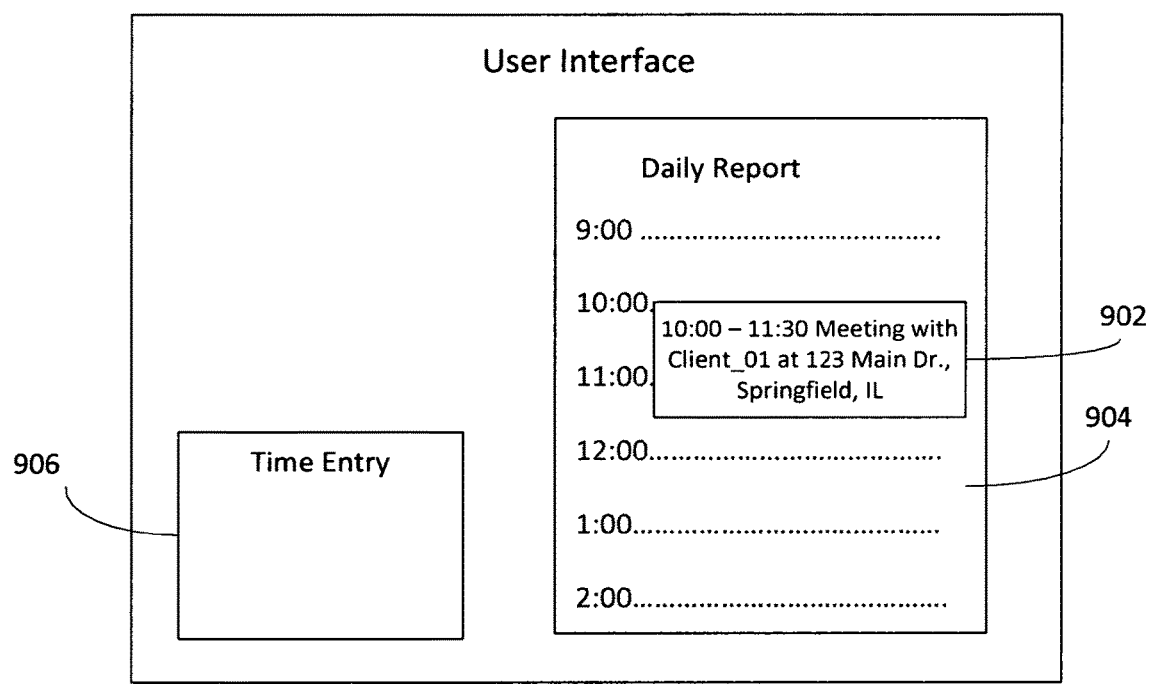

FIG. 9 is a conceptual illustration of a user device 100 capturing unallocated activity data. The wireless communication component 104, GPS 108, or sensor(s) 110 of user device 100 may determine the location data of user device 100. In this embodiment, user device 100 is a mobile device that is capturing the location data as part of the unallocated activity data. The controller(s) 204 receives the location data from user device 100 as a request for unallocated activity data corresponding to the user device 100. The controller(s) 204 sends the unallocated activity data to storage device 216, wherein the unallocated data is then sent to customer database 214. The unallocated activity data is matched to the corresponding data record. In this case, the location would be recognized as Client 01's location and all of the data associated with Client 01's data record is matched to the unallocated activity data. Once the unallocated data is further processed in management controller 212 and relational database 210 it is sent to user device 100 and all of the user devices of the group of user devices, wherein the unallocated activity data is generated into a visual indicator 902. In this embodiment, visual indicator 902 specifies the activity, location, and time associated with the captured unallocated activity data. A time entry can be generated from any user device of the group of user devices. In order to generate a time entry, visual indicator 902 is selected and relocated from Daily Report 904 to Time Entry 906, as described above. The data included in visual indicator 902 is populated into the time entry template when the time entry is generated.

Figure 10:
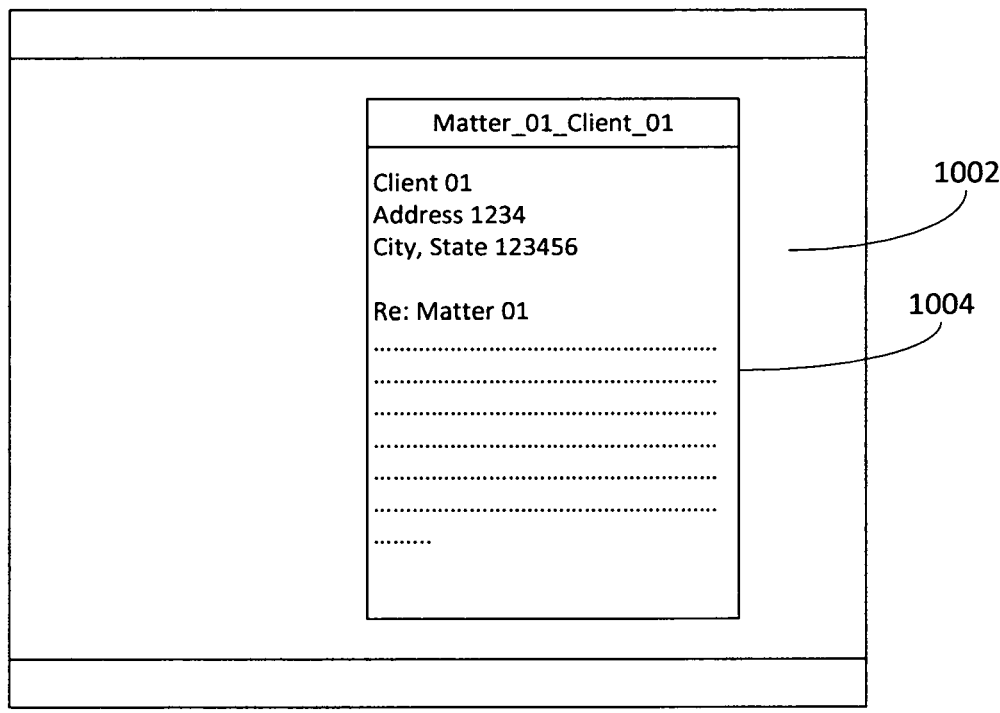
FIG. 10 illustrates another example of a user interface on a user device for capturing activity data in accordance with the present disclosure.
Figure 10:
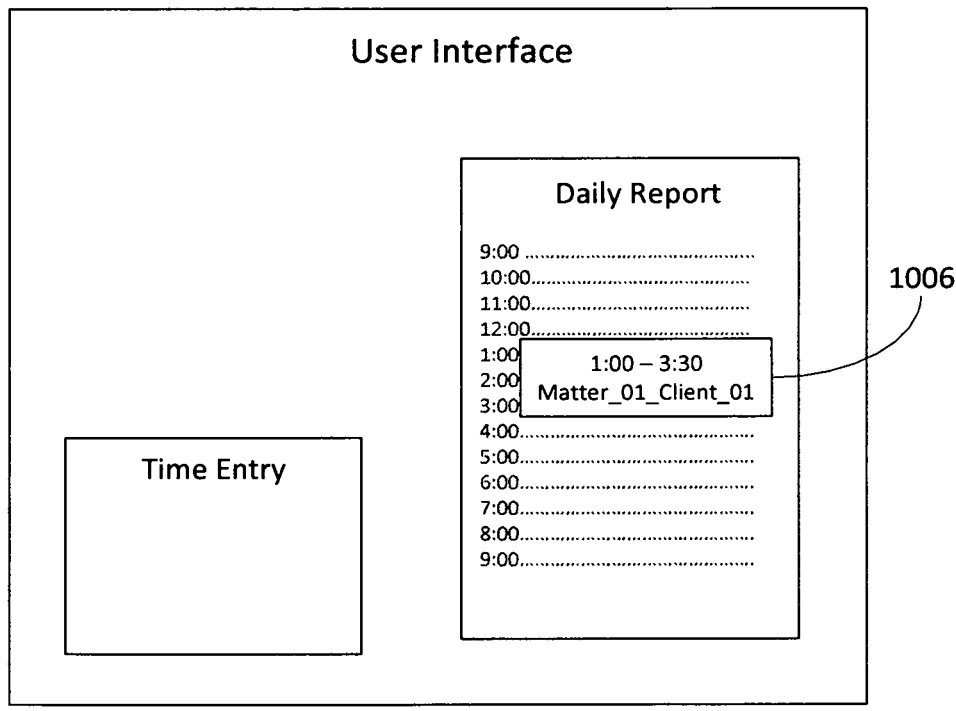

FIG. 10 is an illustration of an embodiment of a user device 100 capturing tracked activity. As shown, user device 100 may comprise a user interface 1002 which further comprises a word processing program (or other application program as described above) that has an electronic document 1004 open in it. When the electronic document is open, the user device 100 captures that fact as unallocated activity data associated with the electronic document. For example, electronic document 1004 is identified as Matter_01 Client_01. The unallocated activity data associated with electronic document 1004 (which may include how long the document remained opened) is extracted and sent to controller(s) 204, which associates the unallocated activity data of electronic document 1004 with Client 01 and Matter 01. When controller(s) 204 sends the unallocated activity data back to user device(s) 100, a visual indicator 1006 is generated, which exhibits the duration of this unallocated activity data (e.g., how long this document was opened), the time of day it took place, the matter, and the client. All of the unallocated activity data is synchronized across all user devices in the group of user devices. Furthermore, the data in visual indicator 1006 may be populated into the time entry template when visual indicator 1006 is relocated from "Daily Report" to "Time Entry" and a time entry is generated.

The above detailed description and the examples described therein have been presented for the purposes of illustration and description only and not by way of limitation. It is therefore contemplated that the present disclosure covers any and all modifications, variations, or equivalents that fall within the spirit and scope of the basic underlying principles disclosed above and claimed herein.

What is claimed is:
1. A method for synchronizing tracked activity data in a system comprising a controller in communication with a plurality of user devices, the method comprising:
    receiving, by the controller, identification data for a group of user devices of the plurality of user devices, the group of user devices being associated with a single user identification to track activities related to the single user identification;

receiving, by the controller from a first user device of the group of user devices, a selection of one or more identified activity to be tracked, the one or more identified activity selected from a plurality of possible activities;

receiving, by the controller, tracked activity data recorded by the first user device, the tracked activity data indicative of an event concerning the one or more identified activity;

receiving, by the controller, additional tracked activity data recorded by a second user device of the group of user devices, the additional tracked activity data indicative of the event concerning the one or more identified activity;

synchronizing, by the controller, the tracked activity data and the additional tracked activity data concerning the one or more identified activity to create a single time entry that is populated based on pattern recognition for one or more previous identified activity which corresponds to the one or more identified activity selected from the plurality of possible activities; and generating, by the controller, an invoice including the single time entry.

2. The method of claim 1 wherein receiving the identification data for the group of user devices further comprises receiving the identification data from one of the user devices in the group of user devices or from another source.

3. The method of claim 1 further comprising:
sending the tracked activity data to a storage device where the tracked activity data may be obtained by a customer database and management controller.

4. The method of claim 1 wherein the tracked activity data corresponds to any one of:
time entries, timer operation, glossaries, and templates.

5. The method of claim 1 further comprising:
storing the tracked activity data, by the controller, in a relational database.

6. A method for synchronizing tracked activity data in a system comprising a controller in communication with a plurality of user devices, the method comprising:

selecting, using a first user device of the plurality of user devices, one or more identified activity to be tracked, the one or more identified activity selected from a plurality of possible activities and relating to a single user identification;

tracking activity data, using the first user device, concerning the one or more identified activity to provide the tracked activity data;

tracking additional activity data, using a second user device of the plurality of user devices, concerning the one or more identified activity to provide additional tracked activity data;

synchronizing, by the controller, the tracked activity data and the additional tracked activity data concerning the one or more identified activity to create a single time entry that is populated based on pattern recognition for one or more previous identified activity which corresponds to the one or more identified activity selected from the plurality of possible activities;

receiving, by the first user device from the controller, the single time entry based on the synchronized tracked activity data and the additional tracked activity data originated by the second user device of the plurality of user devices; and generating, by the controller, an invoice including the single time entry.

7. The method of claim 6 further comprising:
sending, by the first user device to the controller, identification of the one or more identified activity to be tracked.

8. The method of claim 6 further comprising:
sending, by the first user device to the controller, identification data for a group of user devices of the plurality of user devices, the group of user devices being associated with a single user identification.

9. The method of claim 6 further comprising:
generating, by the first user device, a user interface based on the one or more identified activity, the tracked activity data, and the additional tracked activity data.

10. A controller configured to synchronize tracked activity data from a plurality of user devices, the controller comprising:

at least one processing device that communicates with a plurality of user devices over a wireless data connection; and memory operatively connected to the at least one processing device, the memory comprising executable instructions that when executed by the at least one processing device cause the at least one processing device to:

receive identification data for a group of user devices of the plurality of user devices, the group of user devices being associated with a single user identification;

receive a selection of one or more identified activity to be tracked from a first user device of the group of user devices, the one or more identified activity selected from a plurality of possible activities and relating to the single user identification;

receive the tracked activity data from the first user device of the group of user devices, the tracked activity data indicative of an event concerning the one or more identified activity;

receive additional tracked activity data from a second user device of the group of user devices, the additional tracked activity data indicative of the event concerning the one or more identified activity synchronize the tracked activity data and the additional tracked activity data concerning the one or more identified activity to create a single time entry that is populated based on pattern recognition for one or more previous identified activity which corresponds to the one or more identified activity selected from the plurality of possible activities; and generate an invoice including the single time entry.

11. The controller of claim 10 wherein, those executable instructions, that when executed by the at least one processing device, cause the at least one processing device to receive the identification data are further operative to receive the identification data from one of the user devices in the group of user devices from another source.

12. The controller of claim 10, the memory further comprising executable instructions that, when executed by the at least one processing device, cause the at least one processing device to:

send the tracked activity data to a storage device where the tracked activity data may be obtained by a customer database and management controller.

13. The controller of claim 10 wherein, the tracked activity data corresponds to any one of: time entries, timer operation, glossaries, and templates.

14. The controller of claim 10, the memory further comprising executable instructions that, when executed by the at least one processing device, cause the at least one processing device to:
store the tracked activity data in a relational database.

15. A first user device configured to synchronize tracked activity data, the first user device comprising:
at least one processing device which enables communication with a controller and a plurality of user devices over a wireless data connection; and
memory operatively connected to the at least one processing device, the memory comprising executable instructions that when executed by the at least one processing device cause the at least one processing device to:
receive a selection of one or more identified activity to be tracked by a first user device of the plurality of user devices, the one or more identified activity selected from a plurality of possible activities and relating to a single user identification;
track activity data concerning the one or more identified activity to provide the tracked activity data;
receive additional tracked activity data recorded by a second user device of the plurality of user devices, the additional tracked activity data concerning the one or more identified activity;
cause synchronization of the tracked activity data and the additional tracked activity data concerning the one or more identified activity to create a single time entry that is populated based on pattern recognition for one or more previous identified activity which corresponds to the one or more identified activity selected from the plurality of possible activities; and
cause generation of an invoice including the single time entry.

16. The first user device of claim 15, wherein the memory further comprises executable instructions that, when executed by the at least one processing device, cause the at least one processing device to:
send, to the controller, identification of the one or more identified activity to be tracked.

17. The first user device of claim 15 wherein, the memory further comprises executable instructions that, when executed by the at least one processing device, cause the at least one processing device to:
send, to the controller, identification data for a group of user devices of the plurality of user devices, the group of user devices being associated with a single user identification.

18. The first user device of claim 15 wherein, the memory further comprises executable instructions that, when executed by the at least one processing device, cause the at least one processing device to:
generate a user interface based on the one or more identified activity, the tracked activity data and the additional tracked activity data.

19. A method for generating an invoice in a system comprising a controller in communication with a plurality of user devices, the method comprising:
receiving, by the controller from a first user device of the plurality of user devices, tracked activity data indicative of an event concerning one or more identified activity, the one or more identified activity selected from a plurality of possible activities;
receiving, by the controller, additional tracked activity data recorded by a second user device of the plurality of user devices, the additional tracked activity data indicative of the event concerning the one or more identified activity;
receiving, by the controller from the first user device of the plurality of user devices, a request for unallocated activity data corresponding to the second user device, the unallocated activity data different from the tracked activity data;
sending, by the controller to the first user device responsive to the request, the unallocated activity data including the additional tracked activity data;
causing generation, at the first user device, of a user interface including a plurality of visual indicators, with one or more of the visual indicators representing the unallocated activity data including the additional tracked activity data recorded by the second user device;
receiving, by the controller from the first user device, a selection indication corresponding to multiple of the visual indicators, at least one of the visual indicators corresponding to a selected portion of the unallocated activity data including the additional tracked activity data;
synchronizing, by the controller based on the selection indication, the tracked activity data and the additional tracked activity data concerning the one or more identified activity to create a single time entry having a duration calculated based on the selection indication of the multiple of the visual indicators at the first user device; and
generating, by the controller, the invoice including the single time entry.

20. The method of claim 19, further comprising:
receiving, by the controller, identification data for a group of user devices of the plurality of user devices, the group of user devices being associated with a single user identification,
wherein the unallocated activity data comprises additional activity data that is captured by any user device of the group of user devices.

21. The method of claim 19, wherein receiving the selection indication further comprises:
receiving, by the controller from the first user device, data indicative of relocation of a visual indicator representative of the selected portion of the unallocated activity data to a defined area of a user interface of the first user device.

22. The method of claim 19, wherein generating the invoice comprises:
calculating, by the controller, a duration of the selected portions of the unallocated activity data; and
populating, by the controller, a template with data associated with the selected portions of the unallocated activity data.

23. The method of claim 19, wherein the time entry includes at least one of a client name, a matter, a task, a fee, a phase, and an activity.

24. A method for generating an invoice in a system comprising a controller in communication with a plurality of user devices, the method comprising:
receiving a selection of one or more identified activity to be tracked, the one or more identified activity selected from a plurality of possible activities;
receiving, by the controller, tracked activity data recorded by a first user device of the plurality of user devices, the tracked activity data indicative of an event concerning the one or more identified activity;

receiving, by the controller, additional tracked activity data recorded by a second user device of the plurality of user devices, the additional tracked activity data indicative of the event concerning the one or more identified activity;

sending, by the first user device of the plurality of user devices to the controller, a request for unallocated activity data corresponding to the second user device, the unallocated activity data different from the tracked activity data;

receiving, by the first user device from the controller, the unallocated activity data including the additional tracked activity data;

generating, by the first user device, a user interface including a plurality of visual indicators, with one or more of the visual indicators representing the unallocated activity data including the additional tracked activity data recorded by the second user device;

sending, by the first user device to the controller, a selection indication corresponding to multiple of the visual indicators, at least one of the visual indicators corresponding to a selected portion of the unallocated activity data including the additional tracked activity data;

synchronizing, by the controller based on the selection indication, the tracked activity data and the additional tracked activity data concerning the one or more identified activity to create a single time entry having a duration calculated based on the selection indication of the multiple of the visual indicators at the first user device; and generating, by the controller, the invoice including the single time entry.

25. The method of claim 24, further comprising:

sending, by the first user device to the controller, identification data for a group of user devices of the plurality of user devices, the group of user devices being associated with a single user identification, wherein the unallocated activity data includes additional activity data that is captured by any user device of the group of user devices.

26. The method of claim 24, wherein generating the user interface further comprises:

for at least two portions of the unallocated activity data, generating a visual indicator, each visual indicator being shaped and sized such that, during simultaneous display of the visual indicators, each of the visual indicators remains selectable.

27. The method of claim 26, wherein the shape and size of each visual indicator corresponds to a duration of the unallocated activity data.

28. The method of claim 26, wherein a portion of the visual indicator is configured such that it remains unobstructed by other visual indicators.

29. The method of claim 26, wherein each visual indicator has a visual characteristic that is different than the other visual indicators.

30. A controller configured to generate an invoice, the controller comprising:

at least one processing device configured to communicate with a plurality of user devices over a wireless data connection; and memory operatively connected to the at least one processing device, the memory comprising executable instructions that when executed by the at least one processing device cause the at least one processing device to:

receive tracked activity data recorded by a first user device of the plurality of user devices, the tracked activity data indicative of an event concerning one or more identified activity, the one or more identified activity selected from a plurality of possible activities;

receive additional tracked activity data recorded by a second user device of the plurality of user devices, the additional tracked activity data indicative of the event concerning the one or more identified activity;

receive, from the first user device of the plurality of user devices, a request for unallocated activity data corresponding to the second user device, the unallocated activity data different from the tracked activity data;

send, to the first user device responsive to the request, the unallocated activity data including the additional tracked activity data;

cause generation, at the first user device, of a user interface including a plurality of visual indicators, with one or more of the visual indicators representing the unallocated activity data including the additional tracked activity data recorded by the second user device;

receive, from the first user device, a selection indication corresponding to multiple of the visual indicators, at least one of the visual indicators corresponding to a selected portion of the unallocated activity data including the additional tracked activity data; and synchronize, based on the selection indication, the tracked activity data and the additional tracked activity data concerning the one or more identified activity to create a single time entry having a duration calculated based on the selection indication of the multiple of the visual indicators at the first user device; and generate an invoice based on the single time entry.

31. The controller of claim 30, the memory further comprising executable instructions that, when executed by the at least one processing device, cause the at least one processing device to:

receive identification data for a group of user devices of the plurality of user devices, the group of user devices being associated with a single user identification, wherein the unallocated activity data includes additional activity data that is captured by any user device of the group of user devices.

32. The controller of claim 30, the memory further comprising executable instructions that, when executed by the at least one processing device, cause the at least one processing device to:

receive, from the first user device, data indicative of relocation of a visual indicator representative of the selected portion of the unallocated activity data to a defined area of a user interface of the first user device.

33. The controller of claim 30, the memory further comprising executable instructions that, when executed by the at least one processing device cause the at least one processing device to:

calculate a duration of the selected portion of the unallocated activity data; and populate a template with data associated with the selected portion of the unallocated activity data.

34. The controller of claim 30, wherein the time entry includes to at least one of a client name, a matter, a task, a fee, a phase, and an activity.

35. A first user device configured to track activity data, the first user device comprising:
- at least one processing device which enables communication with a controller and a plurality of user devices over a wireless data connection; and
- memory operatively connected to the at least one processing device, the memory comprising executable instructions that when executed by the at least one processing device cause the at least one processing device to:
  - receive a selection of one or more identified activity to be tracked from a plurality of possible activities;
  - send, to the controller, tracked activity data indicative of an event concerning the one or more identified activity;
  - send, to the controller, a request for unallocated activity data corresponding to a second user device of the plurality of user devices, the unallocated activity data different from the tracked activity data;
  - receive, from the controller, the unallocated activity data including additional tracked activity data recorded by the second user device, the additional tracked activity data indicative of the event concerning the one or more identified activity;
  - generate a user interface including a plurality of visual indicators, with one or more of the visual indicators representing the unallocated activity data including the additional tracked activity data recorded by the second user device; and
  - send, to the controller, a selection indication corresponding to multiple of the visual indicators, at least one of the visual indicators corresponding to at least one selected portion of the unallocated activity data including additional tracked activity data so that the controller synchronizes the tracked activity data and the additional tracked activity data concerning the one or more identified activity to create a single time entry having a duration calculated based on the selection indication of the multiple of the visual indicators at the first user device and generates an invoice including the single time entry.

36. The first user device of claim 35, the memory further comprising executable instructions that, when executed by the at least one processor, cause the at least one processor to:
- send, to the controller, identification data for a group of user devices of a plurality of user devices, the group of user devices being associated with a single user identification,
- wherein the unallocated activity data includes additional activity data that is captured by any user device the group of user devices.

37. The first user device of claim 35, wherein the executable instructions that, when executed by the processor, cause the processor to generate the user interface data, are further operative when executed by the processor, to:
- generate visual indicators corresponding to at least two portions of the unallocated activity data,
- wherein each visual indicator is shaped and sized such that, during simultaneous display of the visual indicators, each of the visual indicators remains selectable.

38. The first user device of claim 37, wherein the shape and size of each visual indicator corresponds to a duration of unallocated activity data.

39. The first user device of claim 37, wherein a portion of the visual indicator is configured such that it remains unobstructed by other visual indicators.

40. The first user device of claim 37, wherein each visual indicator has a visual characteristic that is different than the other visual indicators.

* * * * *